(12) United States Patent
Oh et al.

(10) Patent No.: US 12,455,475 B2
(45) Date of Patent: Oct. 28, 2025

(54) DISPLAY DEVICE

(71) Applicant: LG ELECTRONICS INC., Seoul (KR)

(72) Inventors: Jaebok Oh, Seoul (KR); Seongmo Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/711,532

(22) PCT Filed: Dec. 2, 2021

(86) PCT No.: PCT/KR2021/018082
§ 371 (c)(1),
(2) Date: May 17, 2024

(87) PCT Pub. No.: WO2023/101055
PCT Pub. Date: Jun. 8, 2023

(65) Prior Publication Data
US 2025/0004328 A1   Jan. 2, 2025

(51) Int. Cl.
*G02F 1/13357* (2006.01)
*G02F 1/1335* (2006.01)

(52) U.S. Cl.
CPC .. *G02F 1/133608* (2013.01); *G02F 1/133603* (2013.01); *G02F 1/133628* (2021.01)

(58) Field of Classification Search
CPC ......... G02F 1/133608; G02F 1/133603; G02F 1/133628; G02F 1/133308;
(Continued)

(56) References Cited

U.S. PATENT DOCUMENTS 7,489,372 B2   2/2009 Ueda
8,390,755 B2   3/2013 Lee
(Continued)

FOREIGN PATENT DOCUMENTS

EP   4113203   1/2023
JP   2017-146333   8/2017
(Continued)

OTHER PUBLICATIONS

Korean Intellectual Property Office Application No. 10-2024-7010950, Office Action dated Oct. 17, 2024, 6 pages.
(Continued)

*Primary Examiner* — Evan P Dzierzynski
(74) *Attorney, Agent, or Firm* — LEE, HONG, DEGERMAN, KANG & WAIMEY

(57) ABSTRACT

A display device is disclosed. The display device may include: a display panel; a frame positioned behind the display panel; a substrate positioned between the display panel and the frame and coupled to the frame; a plurality of light sources positioned on the substrate and providing light to the display panel; an optical part positioned between the display panel and the plurality of light sources; and a supporter positioned between the optical part and the substrate and supporting the optical part, wherein the supporter may be elongated and is positioned between the plurality of light sources and may be detachably coupled to the frame in a longitudinal direction of the supporter.

16 Claims, 21 Drawing Sheets

(58) Field of Classification Search
CPC ............. G02F 1/133314; G02F 1/1335; G02F 1/1336; G02F 1/1333
See application file for complete search history.

(56) References Cited

U.S. PATENT DOCUMENTS

| | | | | |
|---|---|---|---|---|
| 2011/0103040 | A1* | 5/2011 | Teragawa | G02F 1/133608 |
| | | | | 362/223 |
| 2011/0149598 | A1* | 6/2011 | Min | G02F 1/133608 |
| | | | | 362/382 |
| 2016/0320668 | A1* | 11/2016 | Kong | G02F 1/1339 |
| 2016/0357055 | A1* | 12/2016 | Yeo | G02F 1/133608 |

FOREIGN PATENT DOCUMENTS

| | | |
|---|---|---|
| KR | 10-0776877 | 11/2007 |
| KR | 10-1297250 | 8/2013 |
| KR | 10-2016-0046005 | 4/2016 |
| KR | 10-2016-0128799 | 11/2016 |
| WO | 2021-080048 | 4/2021 |

OTHER PUBLICATIONS

PCT International Application No. PCT/KR2021/018082, International Search Report dated Aug. 19, 2022, 4 pages.
European Patent Office Application Serial No. 21966481.0, Search Report dated Jul. 15, 2025, 9 pages.

* cited by examiner

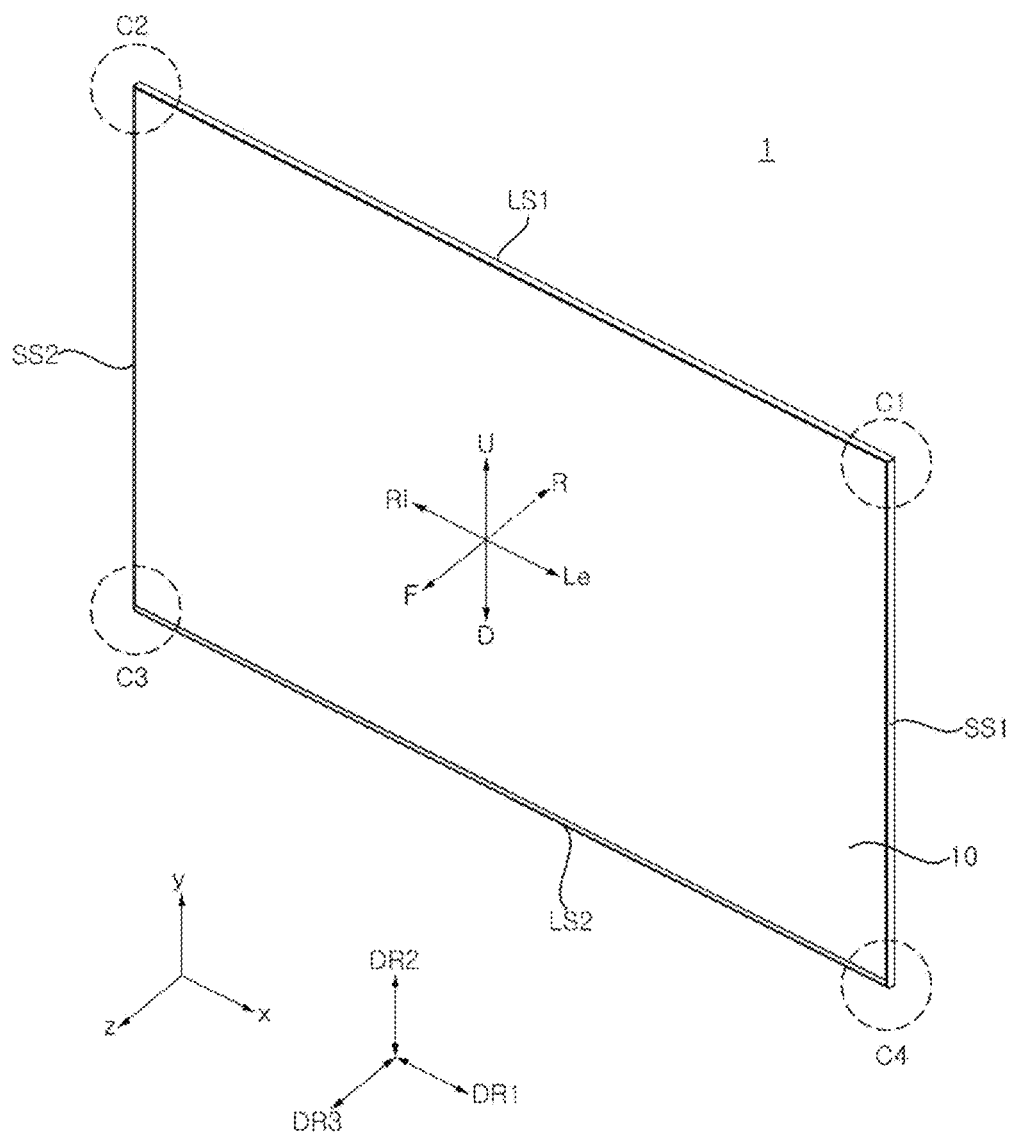
[FIG. 1]

[FIG. 2]
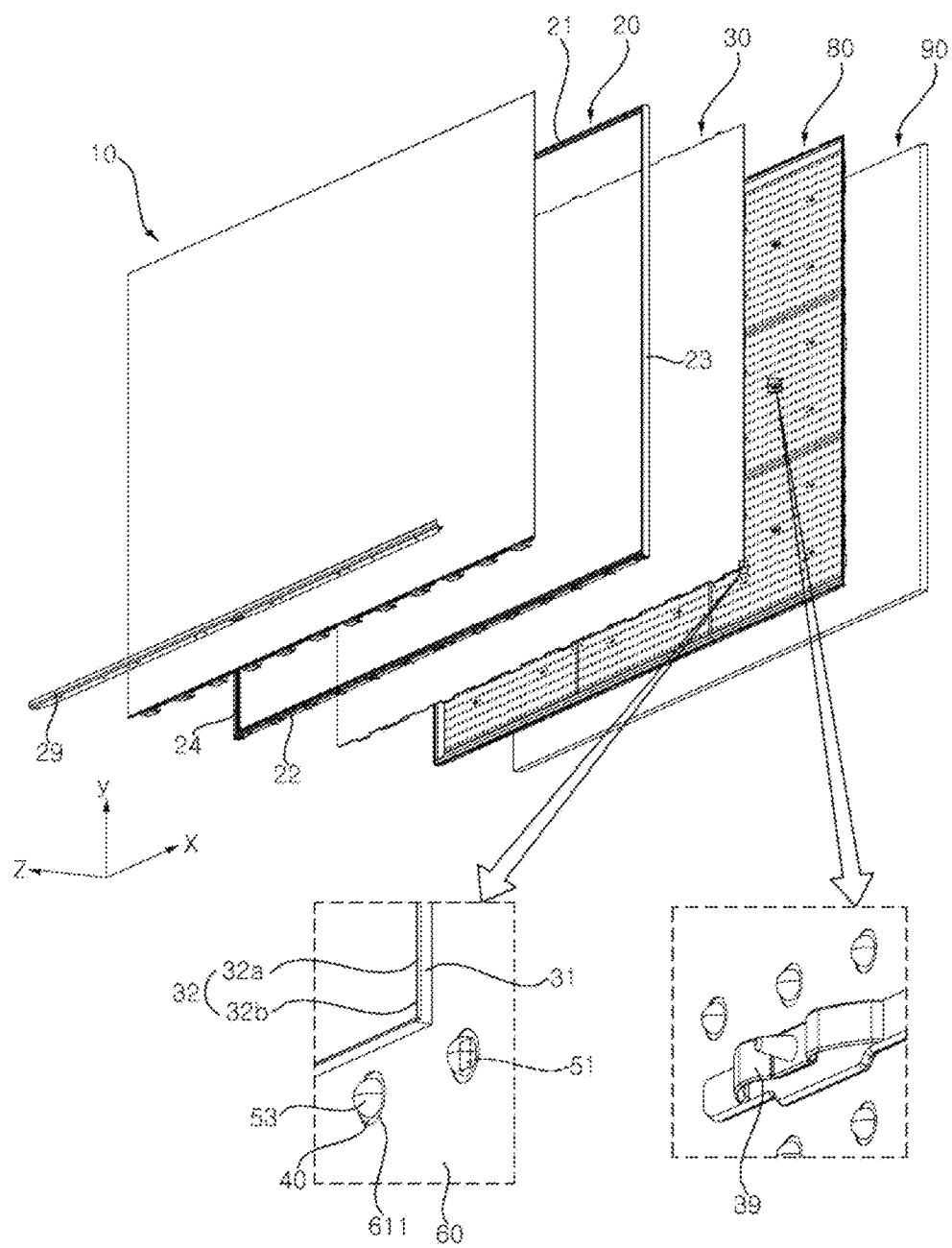

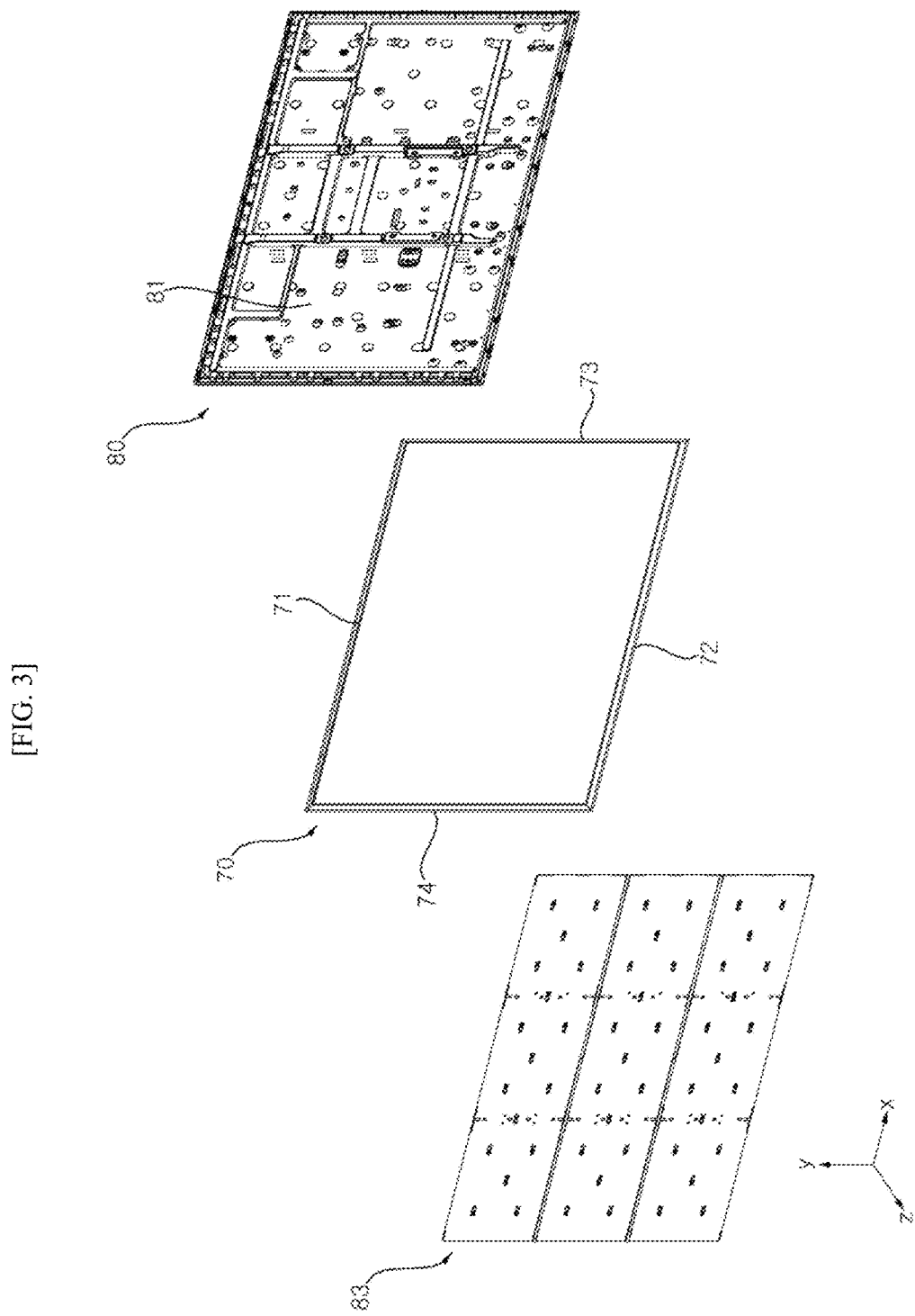
[FIG. 3]

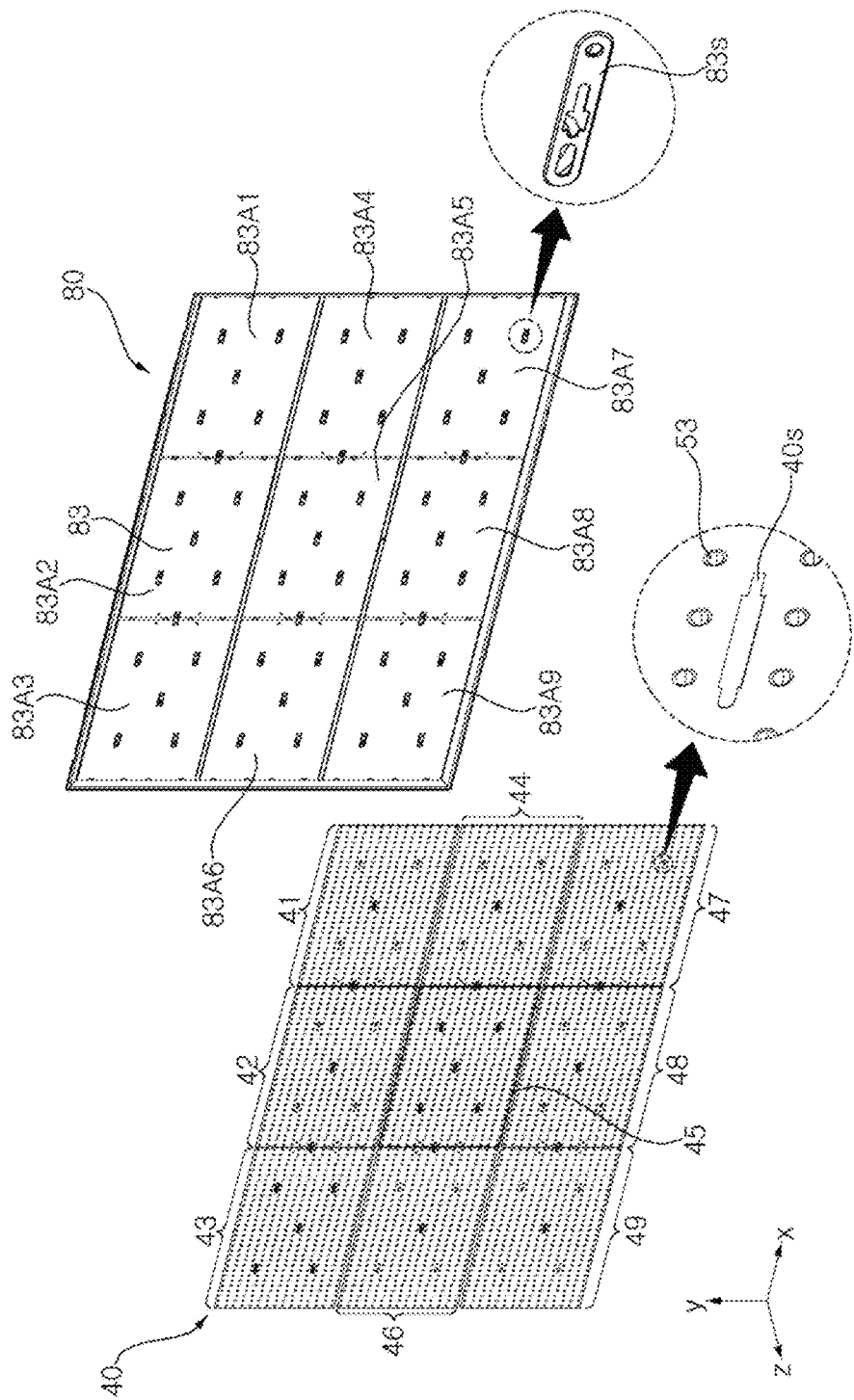
[FIG. 4]

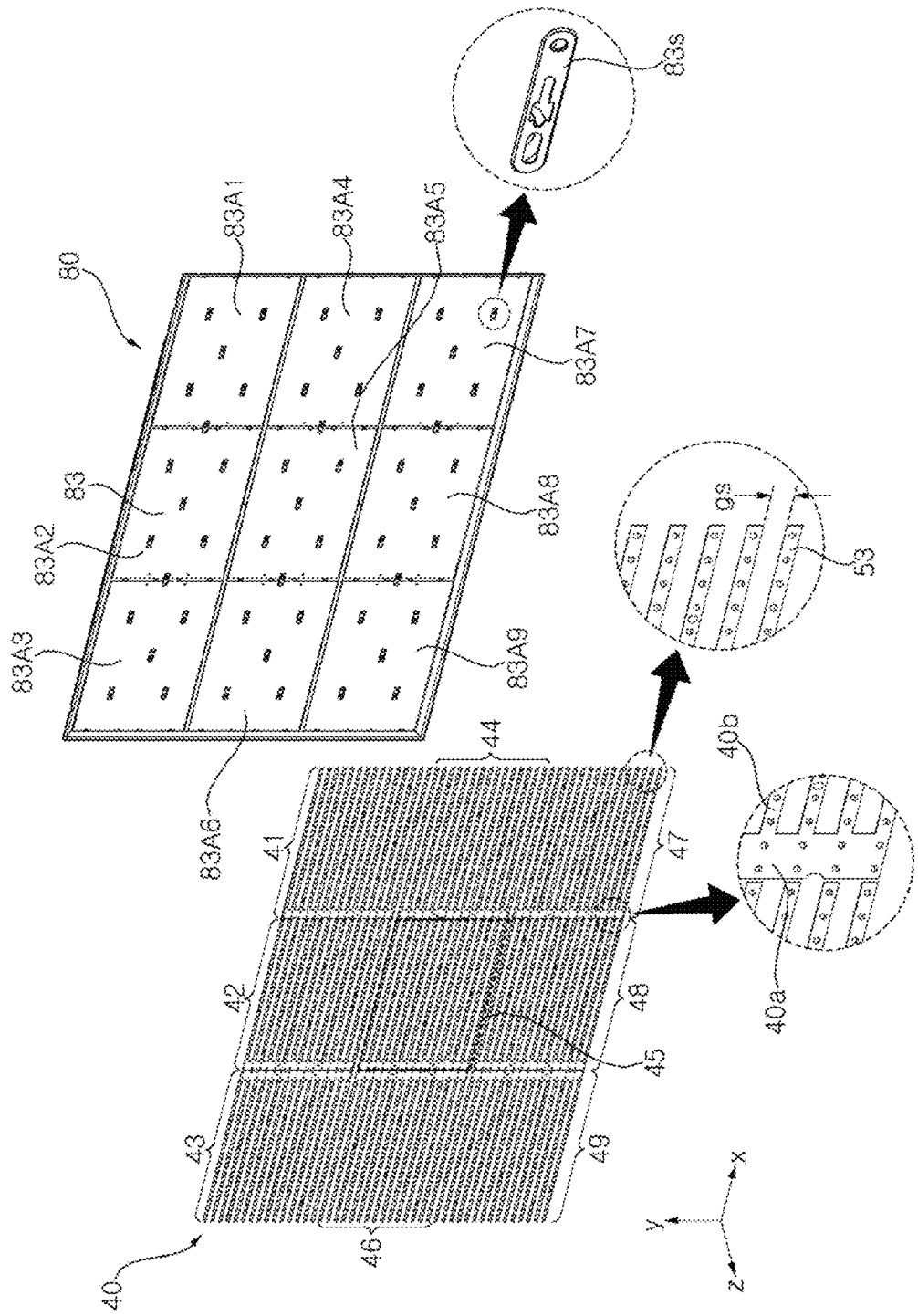
[FIG. 5]

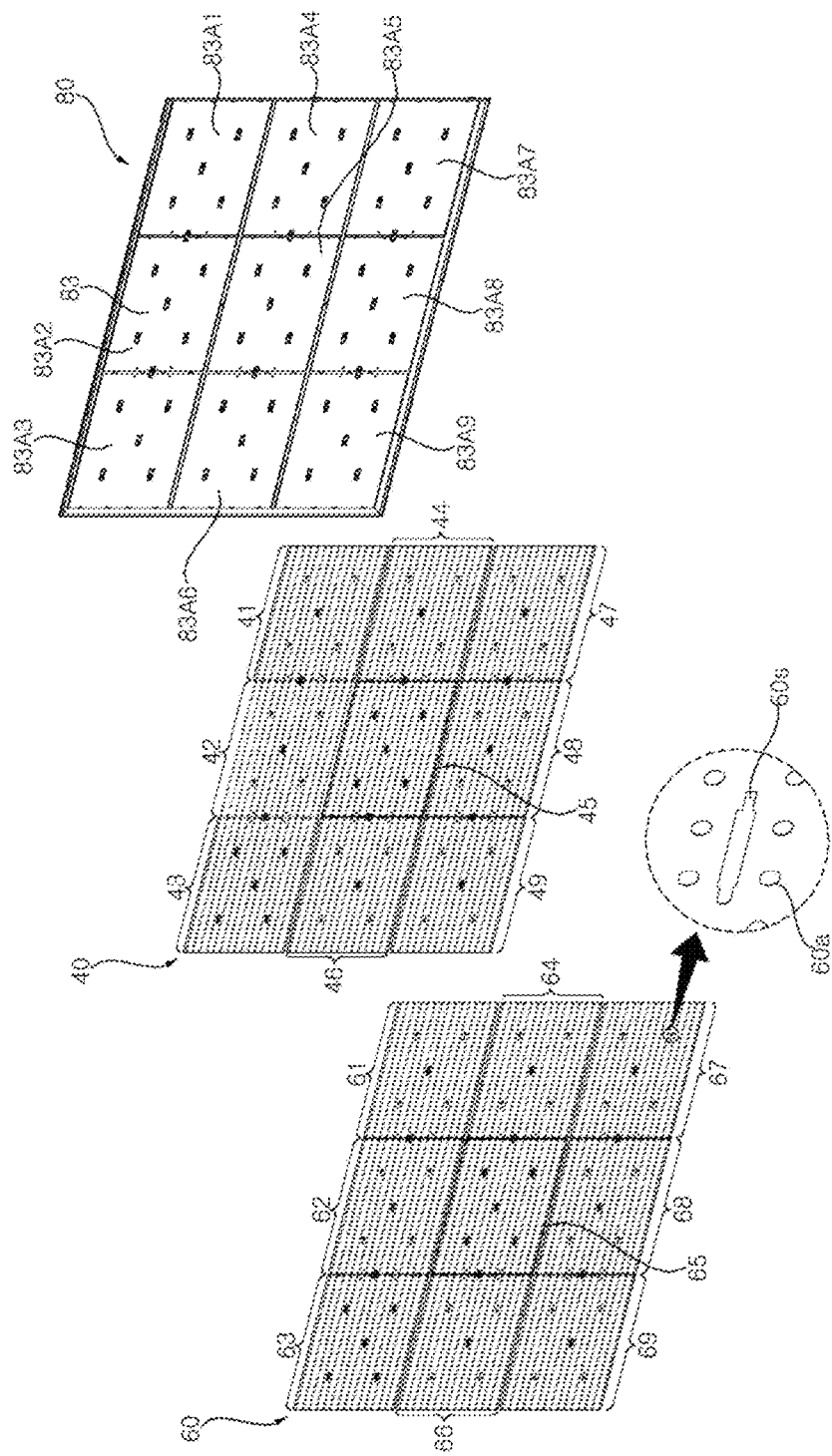
[FIG. 6]

[FIG. 7]
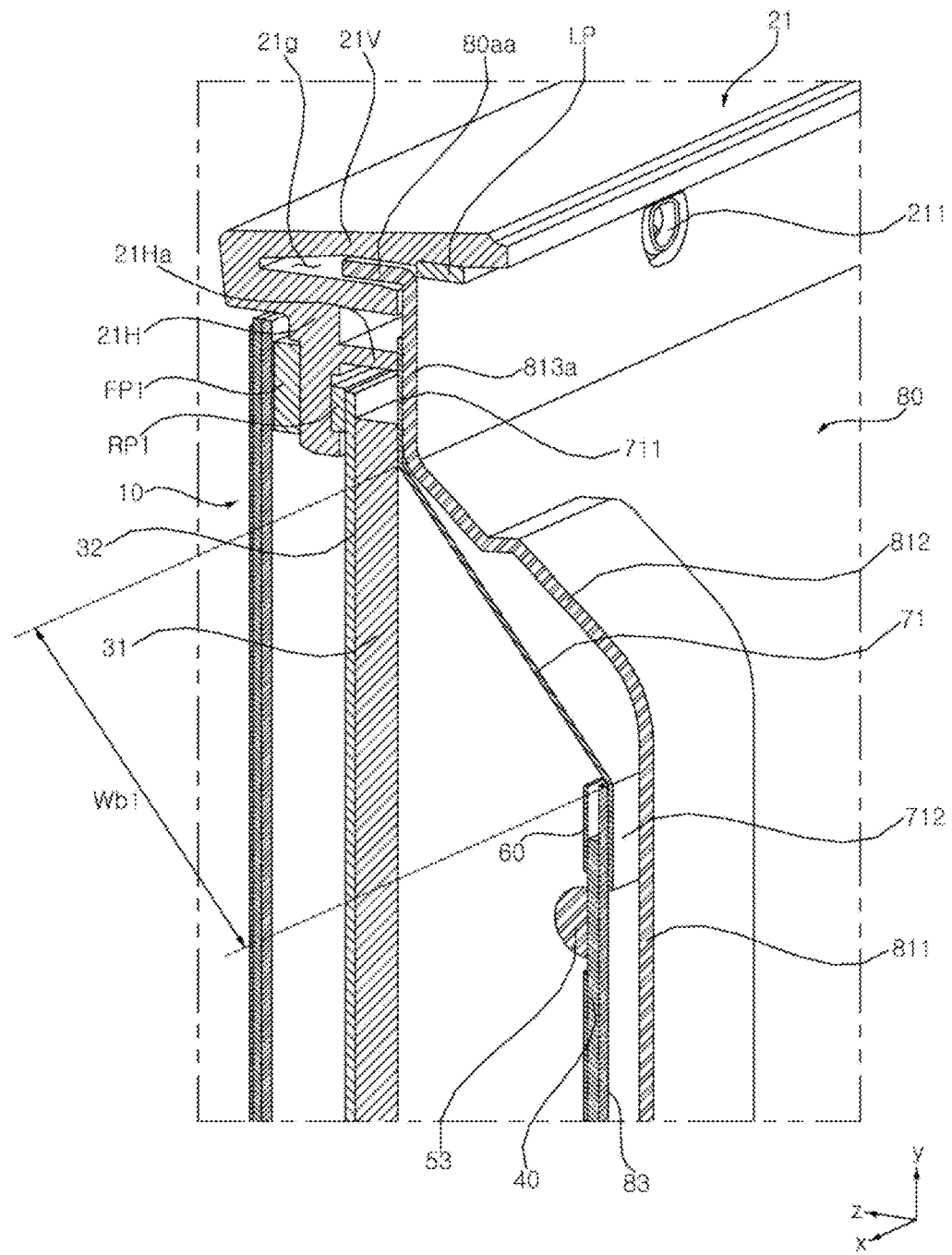

[FIG. 8]
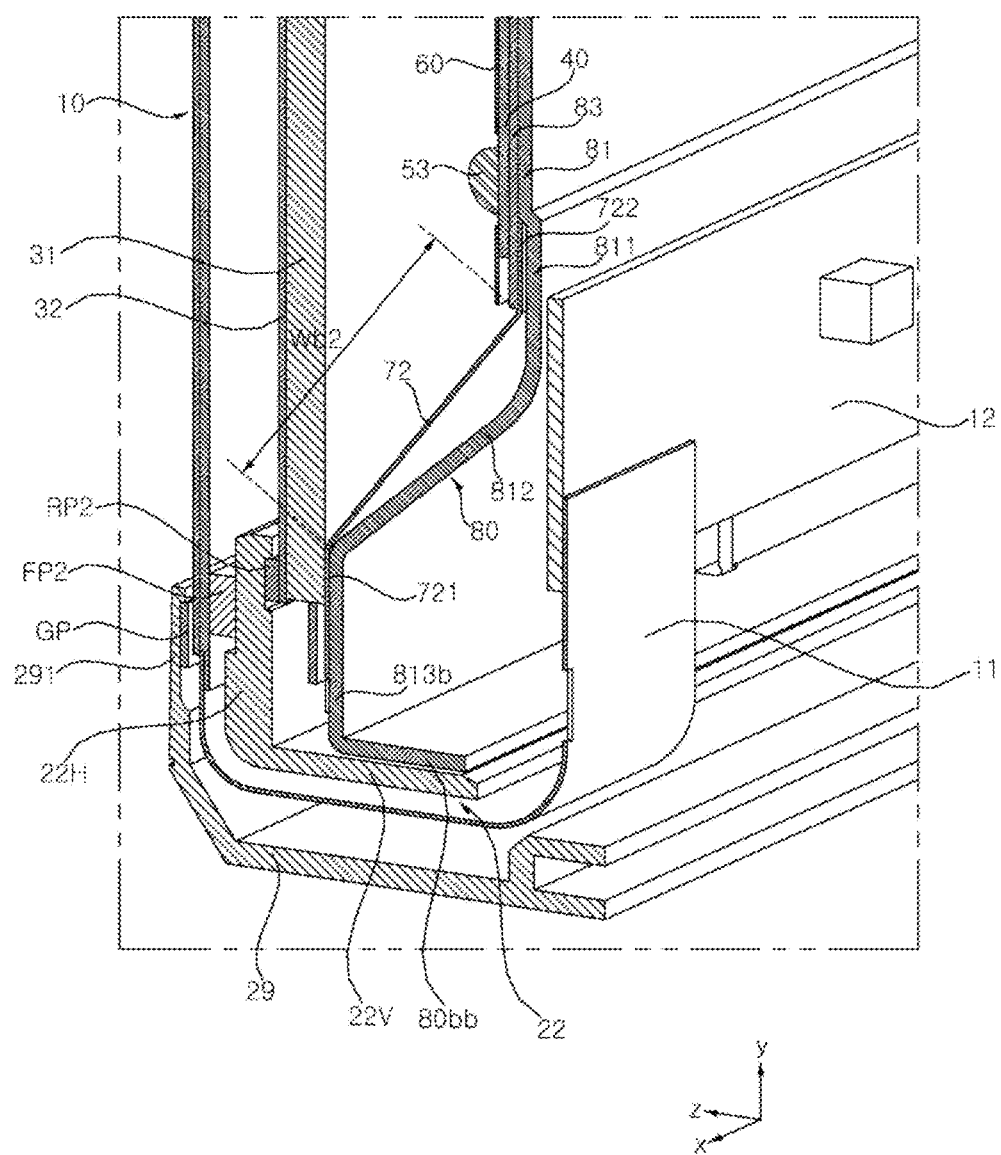

[FIG. 9]
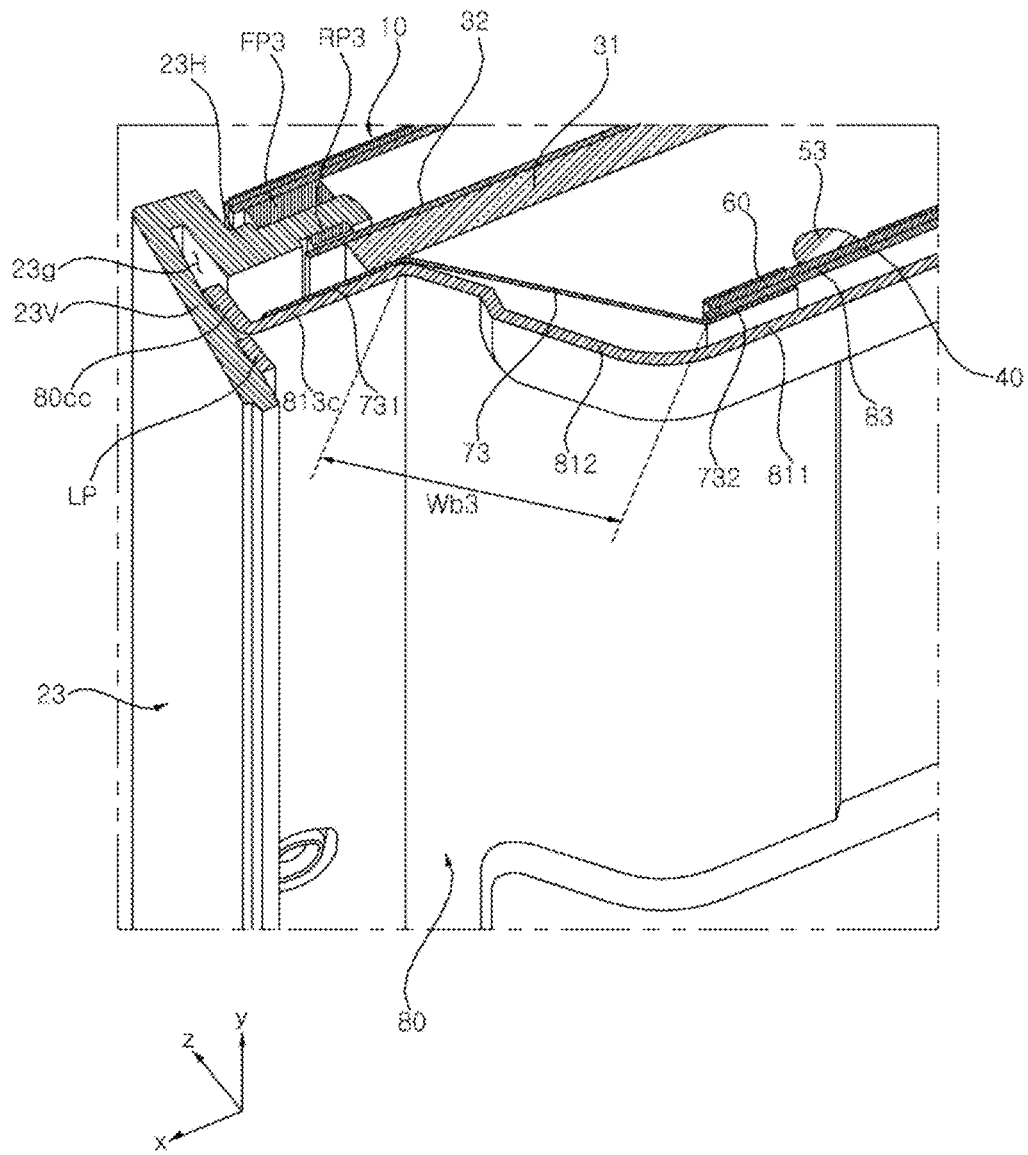

[FIG. 10]
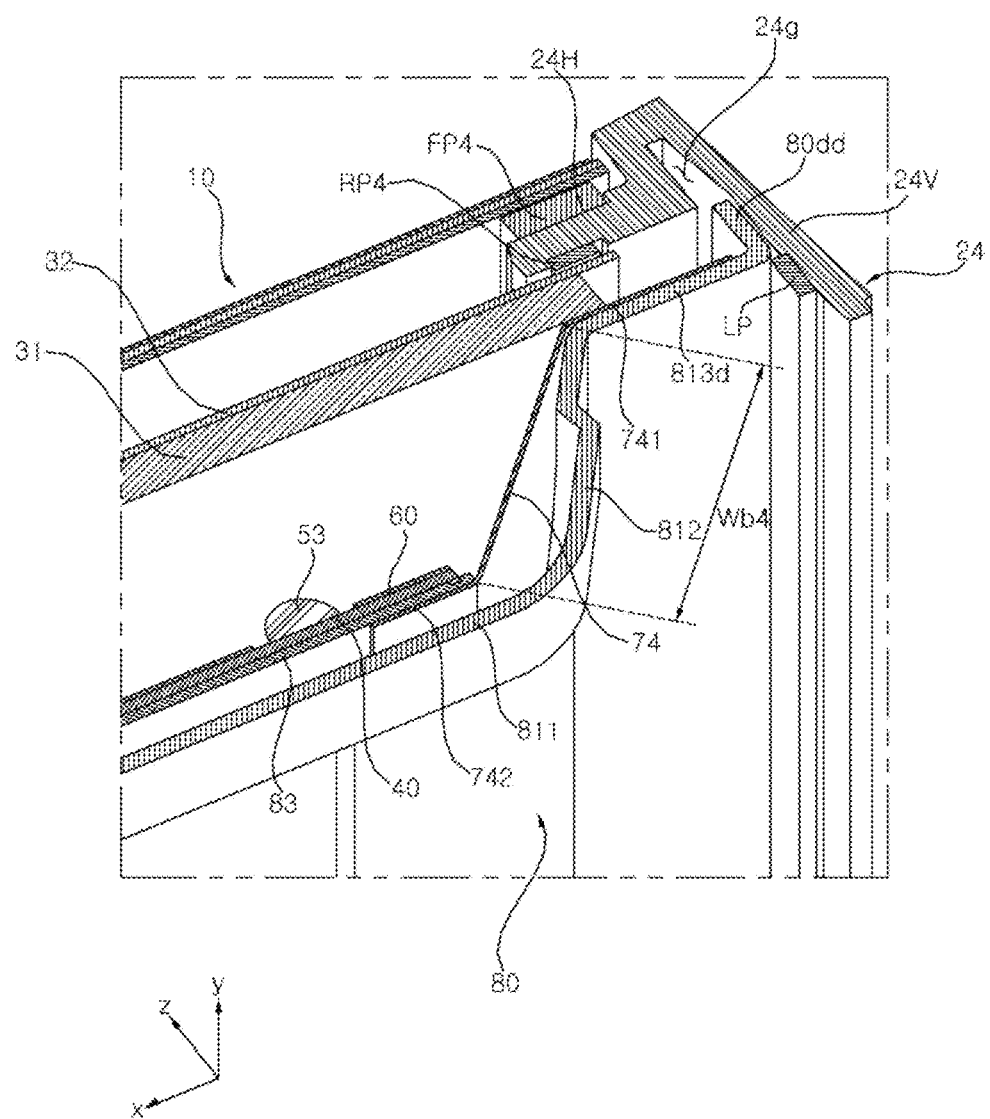

[FIG. 11]
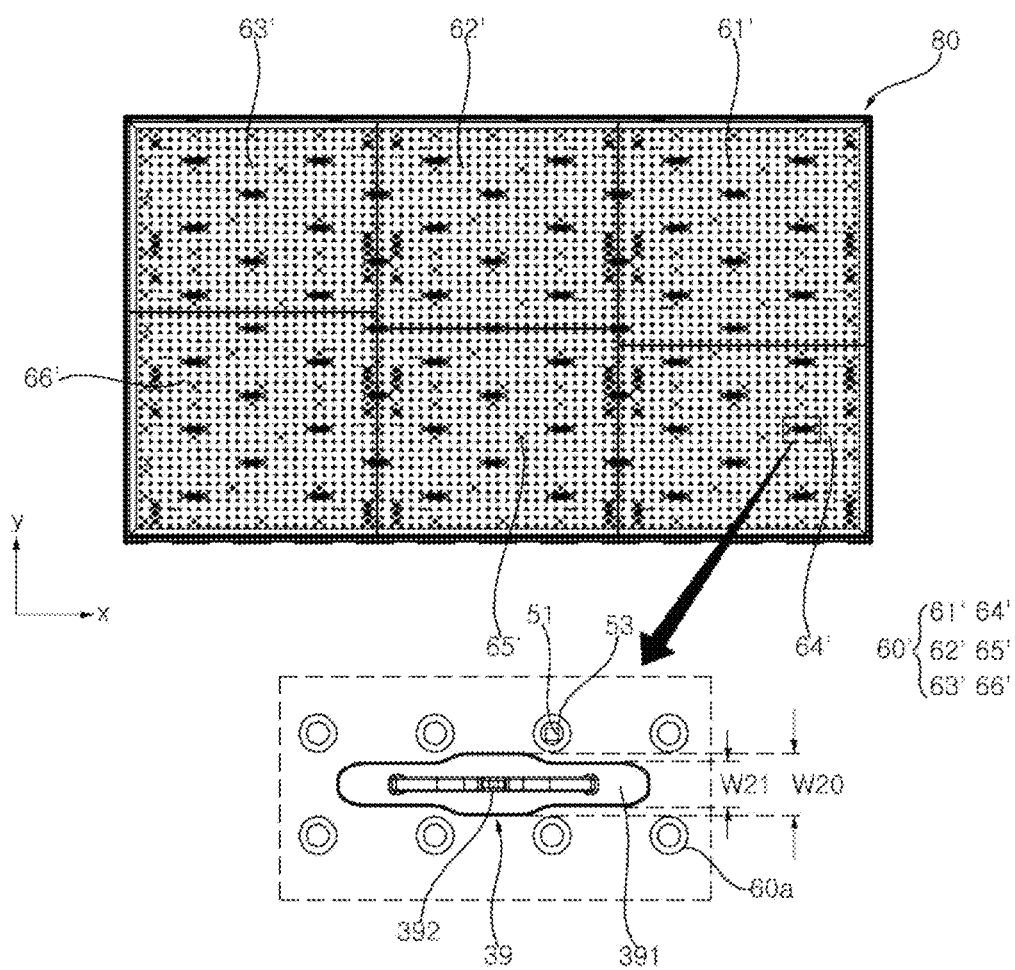

[FIG. 12]
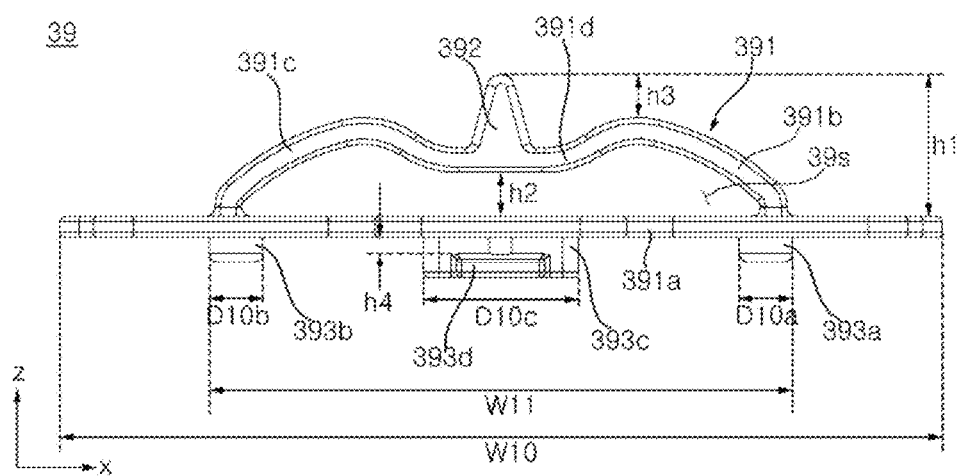

[FIG. 13]
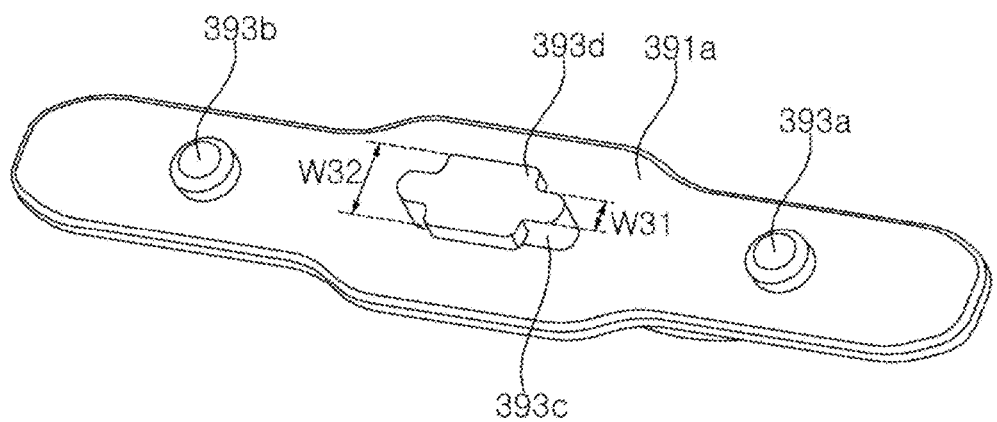

[FIG. 14]
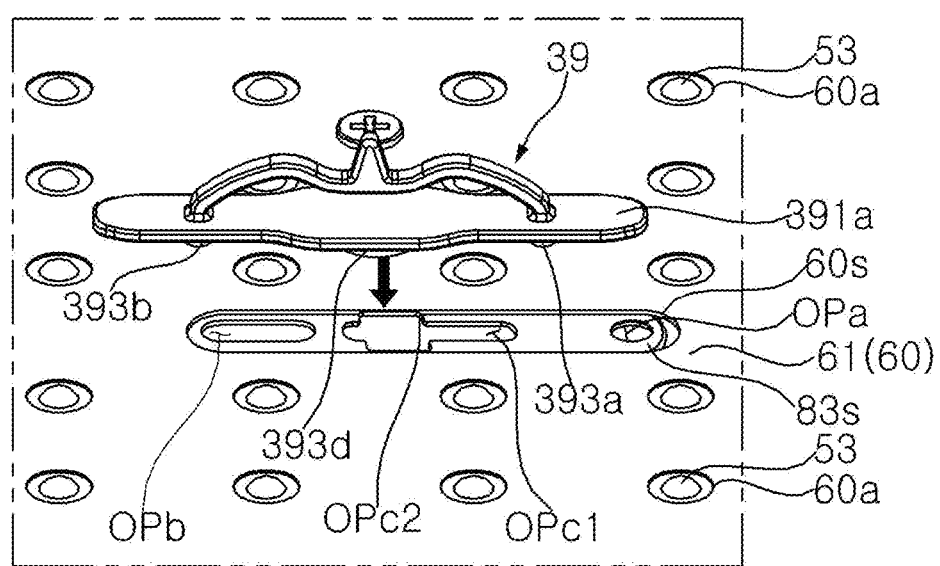

[FIG. 15]
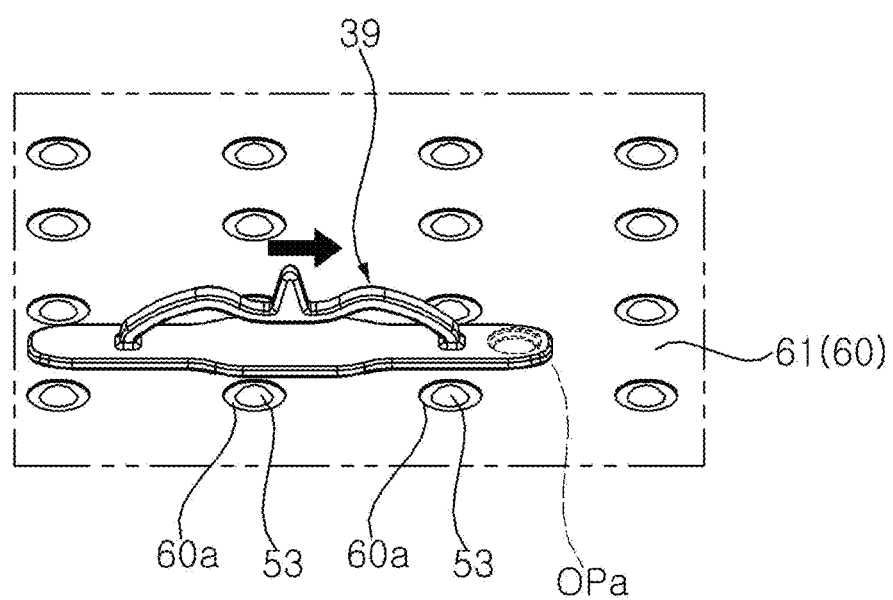

[FIG. 16]
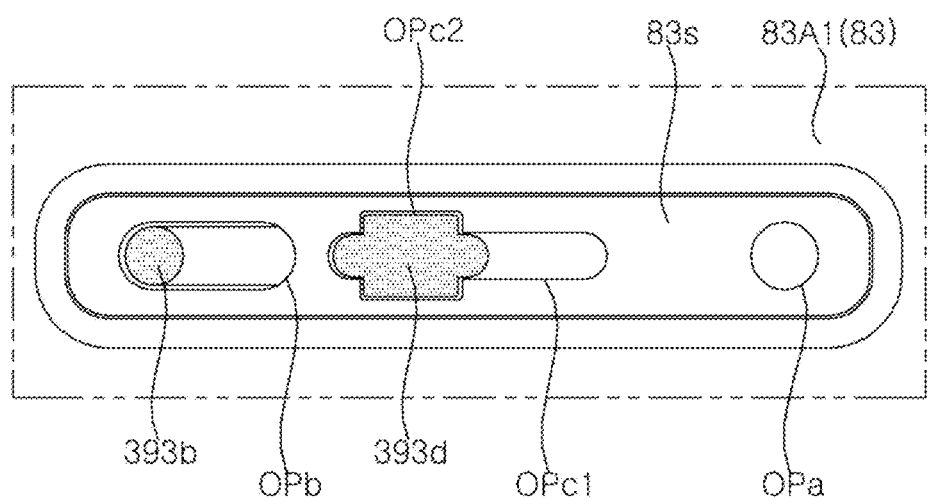

[FIG. 17]
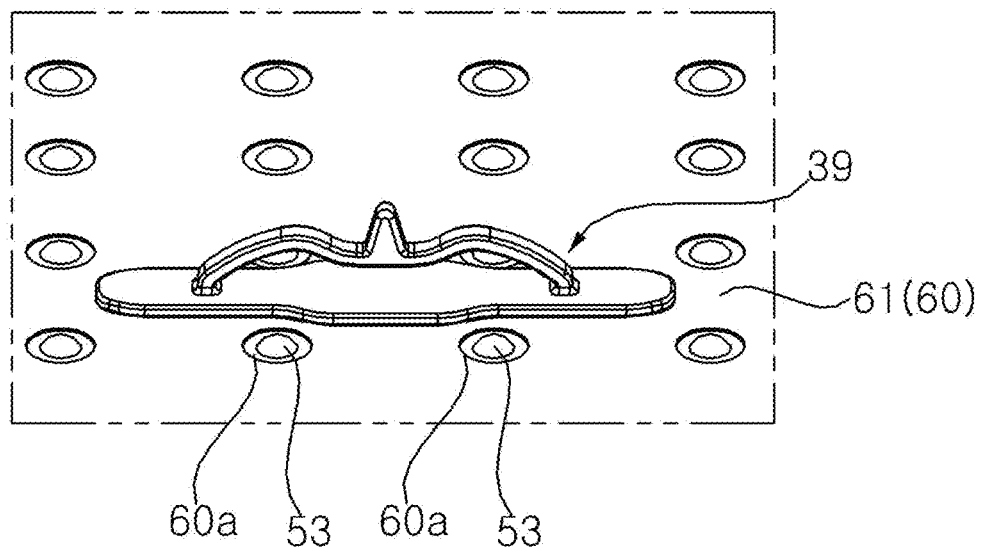

[FIG. 18]
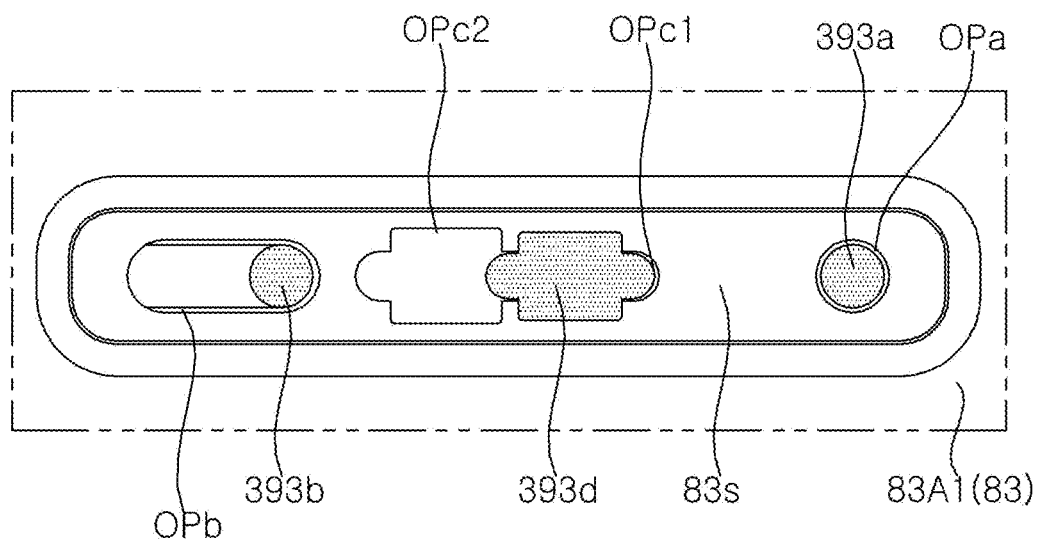

[FIG. 19]
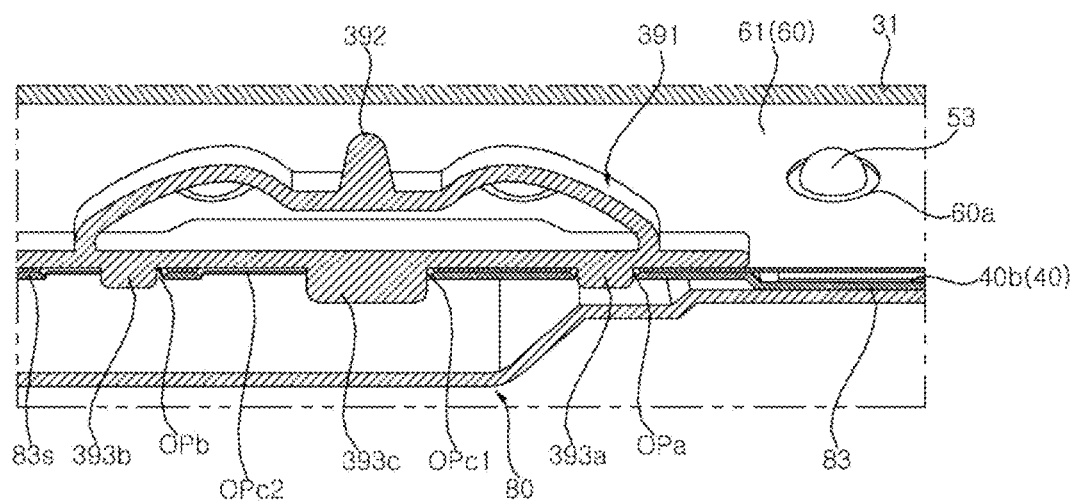

[FIG. 20]
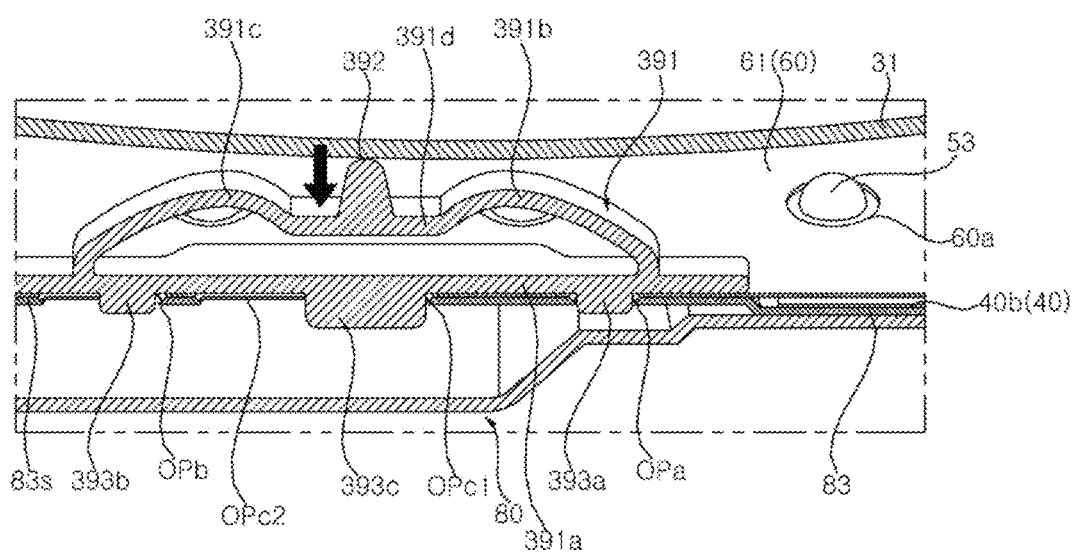

[FIG. 21]
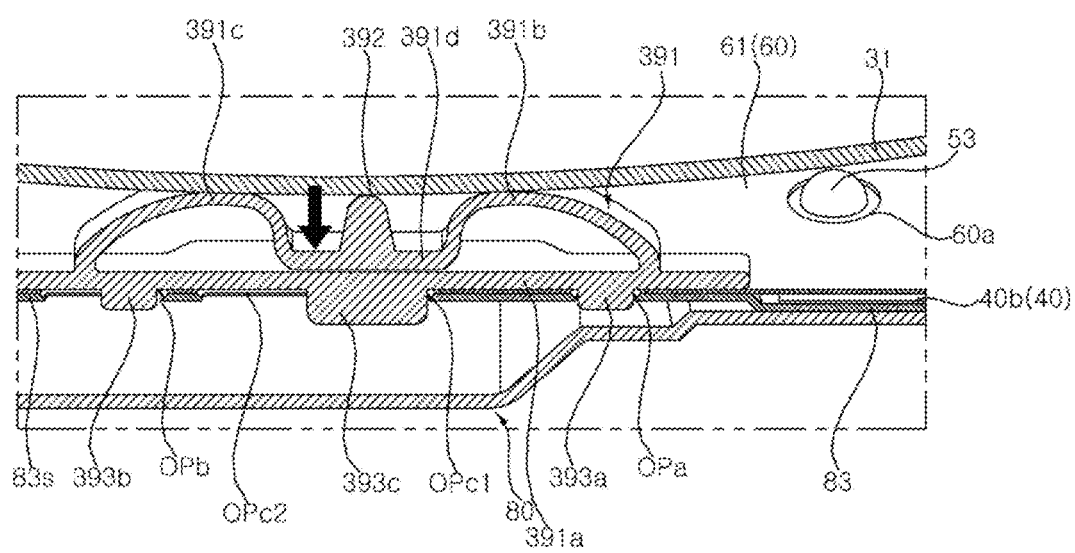

DISPLAY DEVICE

CROSS-REFERENCE TO RELATED APPLICATION(S)

This application is the National Stage filing under 35 U.S.C. 371 of International Application No. PCT/KR2021/018082, filed on Dec. 2, 2021, the contents of which is hereby incorporated by reference herein in its entirety.

TECHNICAL FIELD

The present disclosure relates to a display device.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used.

Among them, an LCD panel includes a TFT substrate and a color substrate that are opposite each other with a liquid crystal layer interposed therebetween, so as to display an image using light provided from a backlight unit.

Recently, with an increase in quality of an image provided by a display device, numerous research has been conducted on a backlight unit that provides high-luminance light to a display panel. In addition, research on the structure of a supporter for supporting a diffusion plate have been actively conducted.

DETAILED DESCRIPTION OF INVENTION

Technical Problems

It is an objective of the present disclosure to solve the above and other problems.

Another objective may be to provide a display device that can reduce the degradation of optical performance of a backlight unit.

Another objective may be to provide a display device that can maintain a gap between a diffusion plate and a light source at a certain level.

Another objective may be to provide a supporter that can be slidably coupled to a frame in a narrow gap between light sources.

Another objective may be to provide a structure that can improve the stability of a supporter coupled to a frame.

Another objective may be to provide a supporter that can effectively support a diffusion plate according to the degree of deflection of the diffusion plate.

Technical Solution

In accordance with an aspect of the present disclosure to achieve the above or other objectives, a display device may include: a display panel; a frame positioned behind the display panel; a substrate positioned between the display panel and the frame and coupled to the frame; a plurality of light sources positioned on the substrate and providing light to the display panel; an optical part positioned between the display panel and the plurality of light sources; and a supporter positioned between the optical part and the substrate and supporting the optical part, wherein the supporter may be elongated, may be positioned between the plurality of light sources, and may be detachably coupled to the frame in a longitudinal direction of the supporter.

Effect of Invention

A display device according to the present disclosure has the following effects.

According to at least one of the embodiments of the present disclosure, it is possible to provide a display device capable of reducing the degradation of optical performance of a backlight unit.

According to at least one of the embodiments of the present disclosure, it is possible to provide a display device capable of maintaining a gap between a diffusion plate and a light source at a certain level.

According to at least one of the embodiments of the present disclosure, it is possible to provide a supporter capable of being slidably coupled to a frame in a narrow gap between light sources.

According to at least one of the embodiments of the present disclosure, it is possible to provide a structure capable of improving the stability of a supporter coupled to a frame.

According to at least one of the embodiments of the present disclosure, it is possible to provide a supporter capable of effectively supporting a diffusion plate according to the degree of deflection of the diffusion plate.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWING

FIGS. 1 to 21 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be understood that the terms "comprises" and/or "has", when used in this specification, specify the presence of a stated feature, number, step, operation, component, element, or combination thereof, but do not preclude the presence or addition of one or more other features, numbers, steps, operations, components, elements, or combinations thereof.

Referring to FIG. 1, a display device 1 may include a display panel 10. The display panel 10 may display a screen.

The display device 1 may include a first long side LS1, a second long side LS2 opposite the first long side LS1, a first short side SS1 adjacent to the first long side LS1 and the second long side LS2, and a second short side SS2 opposite the first short side SS1. For the convenience of explanation, it is illustrated and described that lengths of the first and second long sides LS1 and LS2 are greater than lengths of the first and second short sides SS1 and SS2. However, the lengths of the first and second long sides LS1 and LS2 may be substantially equal to the lengths of the first and second short sides SS1 and SS2.

A direction parallel to the long sides LS1 and LS2 of the display device 1 may be referred to as a left-and-right direction or a first direction DR1. A direction parallel to the short sides SS1 and SS2 of the display device 1 may be referred to as an up-and-down direction or a second direction DR2. A direction perpendicular to the long sides LS1 and LS2 and the short sides SS1 and SS2 of the display device 1 may be referred to as a front-and-rear direction or a third direction DR3.

A direction in which the display panel 10 displays an image may be referred to as a front (F, z), and a direction opposite to the front may be referred to as a rear (R). The first long side LS1 may be referred to as an upper side (U, y). The second long side LS2 may be referred to as a lower side (D). The first short side SS1 may be referred to as a left side (Le, x). The second short side SS2 may be referred to as a right side (Ri).

The first long side LS1, the second long side LS2, the first short side SS1, and the second short side SS2 may be referred to as edges of the display device 1. In addition, points where the first long side LS1, the second long LS2, the first short side SS1, and the second short side SS2 meet one another may be referred to as corners.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Referring to FIG. 2, the display device may include a display panel 10, a side frame 20, a backlight unit, a frame 80, and a back cover 90.

The display panel 10 may define a front surface of the display device, and may display an image. The display panel 10 may display an image in such a manner that each of a plurality of pixels outputs red, green, or blue (RGB) light in accordance with timing. The display panel 10 may be divided into an active area in which an image is displayed and a de-active area in which no image is displayed. The display panel 10 may include a front substrate and a rear substrate that are opposite each other with a liquid crystal layer interposed therebetween. The display panel 10 may be referred to as an LCD panel.

The front substrate may include a plurality of pixels, each of which consists of red, green, and blue subpixels. The front substrate may output light corresponding to red, green, or blue color in response to a control signal.

The rear substrate may include switching elements. The rear substrate may switch a pixel electrode. For example, the pixel electrode may change the molecular arrangement of a liquid crystal layer in response to a control signal input from the outside. The liquid crystal layer may include liquid crystal molecules. The arrangement of liquid crystal molecules may be changed according to a voltage difference between the pixel electrode and a common electrode. The liquid crystal layer may transmit light provided from the backlight unit to the front substrate or block the light.

The side frame 20 may extend along the periphery of the display panel 10. The side frame 20 may cover a lateral surface of the display panel 10. The side frame 20 may be coupled to the display panel 10 or may support the display panel 10. The side frame 20 may be referred to as a guide panel.

The backlight unit may be positioned in rear of the display panel 10. The backlight unit may be coupled to the frame 80 at the front of the frame 80. The backlight unit may be driven by a full driving scheme or a partial driving scheme such as local dimming or impulsive driving. The backlight unit may include light sources 51 configured to emit light forward, a substrate 40 on which the light sources 51 are mounted, lenses 53 covering the light sources 51, a reflective sheet 60 covering a front surface of the substrate 40, and an optical unit 30 positioned in front of the reflective sheet 60.

The light source 51 may be a light emitting diode (LED) chip or an LED package including at least one LED chip. For example, the light source 51 may be a colored LED emitting at least one of red, green, and blue light or a white LED. For example, the light source 51 may be a mini-LED. A power supply (not shown) of the display device may provide power to the light source 51 through the substrate 40.

A plurality of lenses 53 may cover a plurality of light sources 51, respectively. An accommodating portion (no reference numeral) may be formed in a lower surface of the lens 53, and may surround the light source 51. A dome portion (no reference numeral) may define an upper surface of the lens 53, and may have a substantially hemispherical shape. The lens 53 may include at least one of silicone, polymethyl methacrylate (PMMA), and polycarbonate (PC). Light provided by the light source 51 may be refracted or reflected by the lens 53 to spread over a wider beam angle than the light source 51.

The reflective sheet 60 may include at least one of a metal and a metal oxide. For example, the reflective sheet 60 may include a metal and/or a metal oxide having a high reflectance such as at least one of aluminum (Al), silver (Ag), gold (Au), and titanium dioxide (TiO2). For example, resin may be deposited on or applied to the reflective sheet 60, and may diffuse light of the light source 51.

The optical unit 30 may be disposed opposite the display panel 10 with respect to the side frame 20. The optical unit 30 may allow light of the light source 51 to be uniformly transmitted to the display panel 10. The optical unit 30 may include a diffusion plate 31 and an optical sheet 32.

The diffusion plate 31 may be positioned between the reflective sheet 60 and the optical sheet 32. The diffusion plate 31 may diffuse light of the light source 51. In addition, an air gap may be formed between the reflective sheet 60 and the diffusion plate 31. The air gap may serve as a buffer, and the light of the light source 51 may be widely spread by the air gap.

A supporter 39 may be positioned between the reflective sheet 60 and the diffusion plate 31, so that one side thereof may be coupled to the reflective sheet 60 and the other side thereof may support the diffusion plate 31. The supporter 39 may be referred to as a spacer.

The optical sheet 32 may be adjacent to or in contact with a front surface of the diffusion plate 31. The optical sheet 32 may include at least one sheet. For example, the optical sheet 32 may include a plurality of sheets having different functions, and the plurality of sheets may be attached to each other or in close contact with each other. For example, a first optical sheet 32a may be a diffusion sheet, and a second optical sheet 32b may be a prism sheet. The diffusion sheet may prevent light emitted from the diffusion plate 31 from being partially concentrated, thereby achieving uniform distribution of light. The prism sheet may collect light from the diffusion sheet and provide the light to the display panel 10. Here, the number and/or position of the diffusion sheet and the prism sheet may vary.

For example, the optical sheet 32 may change the wavelength or color of light emitted from the light source 51. For example, the optical sheet 32 may include a red-based phosphor and/or a green-based phosphor. In this case, the light source 51 may provide blue-based light, and the optical sheet 32 may convert the blue light provided by the light source 51 to white light. The optical sheet 32 may be referred to as a quantum dot (QD) sheet.

The frame 80 may be positioned in rear of the backlight unit. The display panel 10, the side frame 20, and the backlight unit may be coupled to the frame 80. The frame 80 may support the components of the display device described above and below. For example, the frame 80 may include a metal material such as an as aluminum alloy. The frame 80 may be referred to as a main frame, a module cover, or a cover bottom.

The back cover 90 may cover the rear of the frame 80, and may be coupled to the frame 80. For example, the back cover 90 may be an injection-molded part made of resin. As another example, the back cover 90 may include a metal material.

Referring to FIG. 3, the frame 80 may include a flat plate portion 81. The flat plate portion 81 may define a central area or region of the frame 80. A heat sink 83 may cover the front of the flat plate portion 81, and may be coupled to the flat plate portion 81. A front surface of the heat sink 83 may be flat.

A side portion 70 may be disposed at an edge of the heat sink 83. The side portion 70 may include at least one of a metal and a metal oxide, each of which is a reflective material. For example, the side portion 70 may include a metal and/or a metal oxide having a high reflectance such as at least one of aluminum (Al), silver (Ag), gold (Au), and titanium dioxide (TiO2). For example, resin may be deposited on or applied to the side portion 70.

In addition, the side portion 70 may include a first side portion 71, a second side portion 72, a third side portion 73, and a fourth side portion 74. The side portion 70 may be referred to as a chamfer portion.

Referring to FIG. 4, the substrate 40 may cover the front of the heat sink 83, and may be coupled to the heat sink 83. For example, the substrate 40 may include at least one of polycarbonate (PC), polyethylene terephthalate (PET), glass, and silicon. The substrate 40 may be a printed circuit board (PCB).

The substrate 40 may have a rectangular plate shape. At least one substrate 40 may be provided. The substrate 40 may include a plurality of substrates 41, 42, 43, 44, 45, 46, 47, 48, and 49 adjacent to each other. A first substrate 41, a second substrate 42, a third substrate 43, a fourth substrate 44, a fifth substrate 45, a sixth substrate 46, a seventh substrate 47, an eighth substrate 48, and a ninth substrate 49 may be disposed on an imaginary horizontal plane (i.e., an XY plane). The plurality of substrates 41, 42, 43, 44, 45, 46, 47, 48, and 49 may be coupled to a plurality of areas 83A1, 83A2, 83A3, 83A4, 83A5, 83A6, 83A7, 83A8, and 83A9 of the heat sink 83, respectively.

A plurality of lenses 53 may respectively cover a plurality of light sources 51 mounted on the substrate 40. A power supply (not shown) of the display device may supply power to the light sources 51 through connectors (not shown) mounted on a rear surface of the substrate 40.

Referring to FIG. 5, the substrate 40 may cover the front of the heat sink 83, and may be coupled to the heat sink 83. For example, the substrate 40 may include at least one of polycarbonate (PC), polyethylene terephthalate (PET), glass, and silicon. The substrate 40 may be a printed circuit board (PCB).

For example, the substrate 40 may include straps. The straps may be elongated in a horizontal direction, and may be spaced apart from each other in a vertical direction.

As another example, the substrate 40 may generally have a fork shape. The substrate 40 may include a first plate 40a and a plurality of second plates 40b. The first plate 40a may be elongated vertically. The plurality of second plates 40b may extend from one long side of the first plate 40a in the horizontal direction, and may be spaced apart from each other in the vertical direction.

At least one substrate 40 may be provided. The substrate 40 may include a plurality of substrates 41, 42, 43, 44, 45, 46, 47, 48, and 49 adjacent to each other. A first substrate 41, a second substrate 42, a third substrate 43, a fourth substrate 44, a fifth substrate 45, a sixth substrate 46, a seventh substrate 47, an eighth substrate 48, and a ninth substrate 49 may be disposed on an imaginary horizontal plane (i.e., an XY plane). The plurality of substrates 41, 42, 43, 44, 45, 46, 47, 48, and 49 may be coupled to a plurality of areas 83A1, 83A2, 83A3, 83A4, 83A5, 83A6, 83A7, 83A8, and 83A9 of the heat sink 83, respectively.

A plurality of lenses 53 may respectively cover a plurality of light sources mounted on the substrate 40. A power supply (not shown) of the display device may supply power to the light sources 51 through connectors (not shown) mounted on a rear surface of the substrate 40.

Referring to FIG. 6, the reflective sheet 60 may cover the front of the substrate 40, and may be coupled to the substrate 40. The lenses 53 (see FIGS. 4 and 5) may be positioned in holes 60a of the reflective sheet 60.

The reflective sheet 60 may have a rectangular plate shape. At least one reflective sheet 60 may be provided. The reflective sheet 60 may include a plurality of reflective sheets 61, 62, 63, 64, 65, 66, 67, 68, and 69 adjacent to each other. A first reflective sheet 61, a second reflective sheet 62, a third reflective sheet 63, a fourth reflective sheet 64, a fifth reflective sheet 65, a sixth reflective sheet 66, a seventh reflective sheet 66, an eighth reflective sheet 68, and a ninth reflective sheet 69 may be located on an imaginary horizontal plane (i.e., an XY plane). The plurality of reflective sheets 61, 62, 63, 64, 65, 66, 67, 68, and 69 may be coupled to the plurality of substrates 41, 42, 43, 44, 45, 46, 47, 48, and 49, respectively.

Referring to FIG. 7, a first part 21 of the side frame 20 may extend along an upper side of the display panel 10, and may cover the upper part of the display panel 10 and the frame 80. The first part 21 may include a first vertical portion 21V and a first horizontal portion 21H.

A first groove 21g may be formed from a rear surface of the first vertical portion 21V toward an inside of the first vertical portion 21V, so as to allow an upper distal end 80aa of the frame 80 to be inserted therein.

A first front pad FP1 may be positioned between the display panel 10 and the first horizontal portion 21H, and may be coupled to a front surface of the first horizontal portion 21H. A first rear pad RP1 may be positioned between the first horizontal portion 21H and the optical sheet 32, and may be coupled to a rear surface of the first horizontal portion 21H.

The frame 80 may include a pressed portion 811, a bending portion 812, and a first support portion 813a. The pressed portion 811 may be formed by being pressed rearward from a front surface of the frame 80, and may be spaced rearward from the heat sink 83. The bending portion 812 may be bent from the pressed portion 811 toward the display panel 10. The first support portion 813a may be bent from the bending portion 812 toward the first vertical portion 21V. A coupling portion 211 may protrude from the first horizontal portion 21H toward the first support portion 813a, and may be coupled to the first support portion 813a through a fastening member such as a screw.

The first side portion 71 may extend along an upper side of the heat sink 83, and may be disposed so as to be inclined toward the display panel 10. The first side portion 71 may include a first seating portion 711 and a first engaging portion 712.

The first seating portion 711 may be bent upward at a front end of the first side portion 71, and may be positioned between the first horizontal portion 21H and the first support portion 813a. A portion of the diffusion plate 31 may be positioned between the first horizontal portion 21H and the first seating portion 711, and may press the first seating portion 711 toward the first support portion 813a.

The first engaging portion 712 may be bent downward at a rear end of the first side portion 71, and may be positioned between the heat sink 83 and the pressed portion 811. The first engaging portion 712 may be engaged by a rear surface of the heat sink 83.

Referring to FIG. 8, a second part 22 of the side frame 20 may extend along a lower side of the frame 80, and may cover the lower part of the frame 80. The second part 22 may be positioned between the lower side of the frame 80 and an under cover 29. The second part 22 may include a second vertical portion 22V and a second horizontal portion 22H.

A lower distal end 80bb of the frame 80 may be positioned on the second vertical portion 22V.

A second front pad FP2 may be positioned between the display panel 10 and the second horizontal portion 22H, and may be coupled to a front surface of the second horizontal portion 22H. A second rear pad RP2 may be positioned between the second horizontal portion 22H and the optical sheet 32, and may be coupled to a rear surface of the second horizontal portion 22H.

The frame 80 may include a pressed portion 811, a bending portion 812, and a second support portion 813b. The pressed portion 811 may be formed by being pressed rearward from the front surface of the frame 80, and may be spaced rearward from the heat sink 83. The bending portion 812 may be bent from the pressed portion 811 toward the display panel 10. The second support portion 813b may be bent from the bending portion 812 toward the second vertical portion 22V.

The second side portion 72 may extend along a lower side of the heat sink 83, and may be disposed so as to be inclined toward the display panel 10. The second side portion 72 may include a second seating portion 721 and a second engaging portion 722.

The second seating portion 721 may be bent downward at a front end of the second side portion 72, and may be positioned between the second horizontal portion 22H and the second support portion 813b. A portion of the diffusion plate 31 may be positioned between the second horizontal portion 22H and the second seating portion 721, and may press the second seating portion 721 toward the second support portion 813b.

The second engaging portion 722 may be bent upward at a rear end of the second side portion 72, and may be positioned between the heat sink 83 and the pressed portion 811. The second engaging portion 722 may be engaged by the rear surface of the heat sink 83.

Referring to FIG. 9, a third part 23 of the side frame 20 may extend along a left side of the display panel 10, and may cover the left part of the display panel 10 and the frame 80. The third part 23 may include a third vertical portion 23V and a third horizontal portion 23H.

A third front pad FP3 may be positioned between the display panel 10 and the third horizontal portion 23H, and may be coupled to a front surface of the third horizontal portion 23H. A third rear pad RP3 may be positioned between the display panel 10 and the optical sheet 32, and may be coupled to a rear surface of the third horizontal portion 23H.

The frame 80 may include a pressed portion 811, a bending portion 812, and a third support portion 813c. The pressed portion 811 may be formed by being pressed rearward from the front surface of the frame 80, and may be spaced rearward from the heat sink 83. The bending portion 812 may be bent from the pressed portion 811 toward the display panel 10. The third support portion 813c may be bent from the bending portion 812 toward the third vertical portion 23V.

The third side portion 73 may extend along a left side of the heat sink 83, and may be disposed so as to be inclined toward the display panel 10. The third side portion 73 may include a third seating portion 731 and a third engaging portion 732.

The third seating portion 731 may be bent leftward at a front end of the third side portion 73, and may be positioned between the third horizontal portion 23H and the third support portion 813c. A portion of the diffusion plate 31 may be positioned between the third horizontal portion 23H and the third seating portion 731, and may press the third seating portion 731 toward the third support portion 813c.

The third engaging portion 732 may be bent rightward at a rear end of the third side portion 73, and may be positioned between the heat sink 83 and the pressed portion 811. The third engaging portion 732 may be engaged by the rear surface of the heat sink 83.

Referring to FIG. 10, a fourth part 24 of the side frame 20 may extend along a right side of the display panel 10, and may cover the right part of the display panel 10 and the frame 80. The fourth part 24 may include a fourth vertical portion 24V and a fourth horizontal portion 24H.

A fourth front pad FP4 may be positioned between the display panel 10 and the fourth horizontal portion 24H, and may be coupled to a front surface of the fourth horizontal portion 24H. A fourth rear pad RP4 may be positioned between the display panel 10 and the optical sheet 32, and may be coupled to a rear surface of the fourth horizontal portion 24H.

The frame 80 may include a pressed portion 811, a bending portion 812, and a fourth support portion 813d. The pressed portion 811 may be formed by being pressed rearward from the front surface of the frame 80, and may be spaced rearward from the heat sink 83. The bending portion 812 may be bent from the pressed portion 811 toward the display panel 10. The fourth support portion 813d may be bent from the bending portion 812 toward the fourth vertical portion 24V.

The fourth side portion 74 may extend along a right side of the heat sink 83, and may be disposed so as to be inclined toward the display panel 10. The fourth side portion 74 may include a fourth seating portion 741 and a fourth engaging portion 742.

The fourth seating portion 741 may be bent rightward at a front end of the fourth side portion 74, and may be positioned between the fourth horizontal portion 24H and the fourth support portion 813d. A portion of the diffusion plate 31 may be positioned between the fourth horizontal portion 24H and the fourth seating portion 741, and may press the fourth seating portion 741 toward the fourth support portion 813d.

The fourth engaging portion 742 may be bent leftward at a rear end of the fourth side portion 74, and may be positioned between the heat sink 83 and the pressed portion 811. The fourth engaging portion 742 may be engaged by the rear surface of the heat sink 83.

Referring to FIG. 11, a first reflective sheet 61', a second reflective sheet 62', and a third reflective sheet 63' may be adjacent to an upper side of the frame 80, and may have different shapes. A fourth reflective sheet 64', a fifth reflective sheet 65', and a sixth reflective sheet 66' may be adjacent to a lower side of the frame 80, and may have different shapes.

For example, a plurality of reflective sheets 60' may come in pairs of two, each pair having the same shape. The first reflective sheet 61' may have the same shape as the sixth reflective sheet 66'. The second reflective sheet 62' may have the same shape as the fifth reflective sheet 65'. The third reflective sheet 63' may have the same shape as the fourth reflective sheet 64'.

In this case, a dividing line between the first reflective sheet 61' and the fourth reflective sheet 64' may be located below an imaginary horizontal line that passes through a center of the frame 80. A dividing line between the second reflective sheet 62' and the fifth reflective sheet 65' may be located on the horizontal line. A dividing line between the third reflective sheet 63' and the sixth reflective sheet 66' may be located above the horizontal line.

Referring to FIGS. 12 and 13, the supporter 39 may include a body 391, a head 392, and a foot (393a, 393b, 393c, 393d). The body 391 may be referred to as an elastic portion or a deformable portion. The head 392 may be referred to as a tip portion or a tower. The foot (393a, 393b, 393c, 393d) may be referred to as a fastening portion or a locking portion.

The body 391 may include a base 391a and an elastic portion (391b, 391c, 391d).

The base 391a may be elongated in the left-and-right direction, may be narrow in the up-and-down direction, and may be thin in the front-and-rear direction. A length W10 of the base 391a may be greater than a length W11 of the elastic portion (391b, 391c, 391d), which will be described below. The base 391a may be flat.

A first end and a second end of the elastic portion (391b, 391c, 391d) may be fixed to a front surface of the base 391a. The elastic portion (391b, 391c, 391d) may generally have a semicircular shape with a central portion depressed. A buffer space 39s may be formed between the base 391a and the elastic portion (391b, 391c, 391d). The elastic portion (391b, 391c, 391d) may be referred to as a bridge.

A first part 391b may define the first end of the elastic portion (391b, 391c, 391d) and may be curved. A second part 391c may define the second end of the elastic portion (391b, 391c, 391d) and may be curved. A third part 391d may be positioned between the first part 391b and the second part 391c, and may connect the first part 391b and the second part 391c. The third part 391d may be formed lower than a front end of each of the first part 391b and the second part 391c (see h2 in FIG. 12).

The head 392 may protrude forward from the third part 391d. A front end of the head 392 may be positioned forward relative to the front ends of the first part 391b and the second part 391c (see h3 in FIG. 12). The head 392 may be farthest forward from the base 391a (see h1 in FIG. 12). For example, the front end of head 392 may be rounded. As another example, the front end of the head 392 may be flat.

The foot (393a, 393b, 393c, 393d) may protrude rearward from a rear surface of the base 391a. The foot (393a, 393b, 393c, 393d) may include a first stopper 393a, a second stopper 393b, a protrusion 393c, and a locking portion 393d.

The first stopper 393a may be disposed opposite a distal end of the first part 391b with respect to the base 391a. The first stopper 393a may have a first diameter D10a. The first stopper 393a may be spaced apart from a first end of the base 391a by a certain distance.

The second stopper 393b may disposed opposite a distal end of the second part 391c with respect to the base 391a. The second stopper 393b may have a second diameter D10b. The second stopper 393b may be spaced apart from a second end of the base 391a by a certain distance.

The protrusion 393c may be positioned between the first stopper 393a and the second stopper 393b. The protrusion 393c may be horizontally long and vertically narrow. A length D10c of the protrusion 393c may be greater than a width W31 of the protrusion 393c. In the front-and-rear direction, the protrusion 393c may be aligned with the head 392. The second stopper 393b may be symmetrical to the first stopper 393a with respect to the protrusion 393c.

The locking portion 393d may be formed on a lateral side of the protrusion 393c. A first portion (no reference numeral) of the locking portion 393d may protrude upward from an upper lateral side of the protrusion 393c, and a second portion (no reference numeral) of the locking portion 393d may protrude downward from a lower lateral side of the protrusion 393c. The locking portion 393d may be formed parallel to a rear surface of the protrusion 393c (see W32 of FIG. 13).

The supporter 39 may have elasticity. The supporter 39 may be an injection-molded part. For example, the supporter 39 may include a plastic or resin material. The supporter 39 may include a material having excellent impact resistance and high-temperature reliability.

Referring to FIG. 14, a coupling portion 83s may be formed on the heat sink 83. The coupling portion 83s may be formed by being pressed forward from a rear surface of the heat sink 83 (see FIGS. 4 and 5). The coupling portion 83s may be horizontally long and vertically narrow. The length of the coupling portion 83s may correspond to the length of the supporter 39. The coupling portion 83s may include a first hole OPa, a second hole OPb, an insertion hole OPc1, and an insertion groove OPc2.

The first hole OPa may be adjacent to a left end of the coupling portion 83s, and may be formed through the coupling portion 83s. The first hole OPa may be a round hole. The first hole OPa may have a diameter equal to or slightly greater than the first diameter D10a (see FIG. 12) of the first stopper 393a.

The second hole OPb may be adjacent to a right end of the coupling portion 83s, and may be formed through the coupling portion 83s. The second hole OPb may be a horizontally long hole. A length of a minor axis of the second hole OPb may be equal to or slightly greater than the second diameter D10b (see FIG. 12) of the second stopper 393b. A length of a major axis of the second hole OPb may be greater than the second diameter D10b.

The insertion hole OPc1 may be positioned between the first hole OPa and the second hole OPb, and may be formed through the coupling portion 83s. The insertion hole OPc1 may be located closer to the second hole OPb than the first hole OPa. The insertion hole OPc1 may be a horizontally long hole. A length of a minor axis of the insertion hole OPc1 may be equal to or slightly greater than the width W31 of the protrusion 393c (see FIG. 13). A length of a major axis of the insertion hole OPc1 may be greater than the length D10c of the protrusion 393c (see FIG. 12).

The insertion groove OPc2 may be formed in a portion defining a boundary of the insertion hole OPc2 of the coupling portion 83s. A first portion (no reference numeral) of the insertion groove OPc2 may be recessed upward at a portion defining an upper boundary of the insertion hole OPc2 of the coupling portion 83s. A second portion (no reference numeral) of the insertion groove OPc2 may be recessed downward at a portion defining a lower boundary of the insertion hole OPc2 of the coupling portion 83s. The first portion and the second portion may be aligned vertically. The first portion and the second portion may be located closer to a right boundary of the insertion hole OPc2 than a left boundary thereof. A distance between the first portion and the second portion may be equal to or slightly greater than the width W32 (see FIG. 13) of the locking portion 393d.

The supporter 39 may be positioned at the front of the coupling portion 83s. The second stopper 393b may be aligned to one side of the second hole OPb. The locking portion 393d may be aligned to the insertion groove OPc2. In this case, the first stopper 393a may be offset from the first hole OPa, and may be positioned between the insertion hole OPc1 and the first hole OPa.

The foot (393a, 393b, 393c, 393d) of the supporter 39 may pass through a slot 60s of the reflective sheet 60. The slot 60s may be formed through the reflective sheet 60, and may have a length corresponding to the coupling portion 83s. The foot (393a, 393b, 393c, 393d) of the supporter 39 may pass through a slot 40s of the substrate 40 (see FIG. 4).

The slot 40s may be formed through the substrate 40 (see FIG. 4), and may have a length corresponding to the coupling portion 83s. Alternatively, the foot (393a, 393b, 393c, 393d) of the supporter 39 may be positioned between the second plates 40b of the substrate 40 (see FIG. 5) (i.e., a gap gs in FIG. 5). For example, the gap gs may be about 7 mm.

Referring to FIGS. 15 and 16, the second stopper 393b may be inserted into one side of the second hole OPb. The protrusion 393c may be inserted into one side of the insertion hole OPc1. The locking portion 393d may be inserted into the insertion groove OPc2. In this case, the first stopper 393a (see FIG. 14) may be positioned between the insertion hole OPc1 and the first hole OPa, and may come in contact with a front surface of the coupling portion 83s.

Referring to FIGS. 17 and 18, the second stopper 393b may be moved from one side to the opposite side of the second hole OPb. The protrusion 393c may be moved from one side to the opposite side of the insertion hole OPc1. The first stopper 393a may be moved from the front surface of the coupling portion 83s toward the first hole OPa, and may be inserted into the first hole OPa. In this case, the locking portion 393d may be engaged by a rear surface of the coupling portion 83s.

Thus, a user can couple or remove the supporter 39 to or from the coupling portion 83s in a sliding manner. In addition, a size of the base 391a of the supporter 39 may be greater than a size of the slot 60s of the reflective sheet 60 (see FIG. 14). That is, the supporter 39 may press a front surface of the reflective sheet 60.

Referring back to FIG. 11, the supporter 39 may be positioned between the plurality of lenses 53 in the up-and-down direction. In the up-and-down direction, a maximum width W20 of the supporter 39 may be less than a gap or distance between the plurality of lenses 53. Accordingly, damage to the plurality of lenses 53 and the light sources 51 can be prevented in the process of coupling or removal of the supporter 39 described above.

Meanwhile, the maximum width W20 of the supporter 39 may be formed at a central portion of the body 391, and opposite sides of the central portion may have a width W20 less than the maximum width W20. Alternatively, the supporter 39 may have a constant width W20. Accordingly, it is possible to minimize the supporter 39 coupled to the coupling portion 83s (see FIG. 18) from being tilted in the up-and-down direction.

In addition, as described above, the length W10 of the base 391a may be greater than the length W11 of the elastic portion (391b, 391c, 391d), which will be described later, (see FIG. 12). Accordingly, the base 391a can minimize the supporter 39 coupled to the coupling portion 83s (see FIG. 18) from being tilted in the left-and-right direction.

Referring back to FIGS. 4 and 5, a plurality of coupling portions 83s may be provided on a front surface of the heat sink 83. A plurality of coupling portions 83s may be formed in each of the plurality of areas 83A1, 83A2, 83A3, 83A4, 83A5, 83A6, 83A7, 83A8 and 83A9 of the heat sink 83. The plurality of coupling portions 83s may be formed at boundaries between the plurality of areas 83A1, 83A2, 83A3, 83A4, 83A5, 83A6, 83A7, 83A8 and 83A9 of the heat sink 83. The plurality of coupling portions 83s may be arranged symmetrically in the up-and-down direction and the left-and-right direction.

In this case, a plurality of supporters 39 (see FIG. 11) may be coupled to the plurality of coupling portions 83s, respectively. The number and arrangement of the supporters 39 included in the display device may vary depending on the size and installation environment of the display device.

Referring to FIG. 19, the supporter 39 may be positioned between the reflective sheet 60 and the diffusion plate 31. The head 392 of the supporter 39 may be adjacent to a rear surface of the diffusion plate 31. The head 392 may come in contact with the rear surface of the diffusion plate 31 or may be slightly spaced apart from it.

Referring to FIG. 20, the diffusion plate 31 may be deformable. For example, the diffusion plate 31 may be deformed when the display device is carried or stored (in particular, stored in a flat position). For example, when the display device is operated, the temperature of the diffusion plate 31 may increase, which may cause deformation of the diffusion plate 31. For example, the deformation of the diffusion plate 31 may be deflection (or sagging).

When the diffusion plate 31 is drooped downward, the head 392 of the supporter 39 may support the diffusion plate 31. Depending on the degree of deflection of the diffusion plate 31, the elastic portion (391b, 391c, 391d) may be deformed toward the base 391a. Depending on the degree of restoration of the diffusion plate 31, the elastic portion (391b, 391c, 391d) may be restored to its original state by elastic force.

Referring to FIG. 21, when the diffusion plate 31 is drooped further downward, not only the head 392 of the supporter 39 but also the first part 391b and/or the second part 391c of the elastic portion (391b, 391c, 391d) may support the diffusion plate 31. Depending on the degree of deflection of the diffusion plate 31, the elastic portion (391b, 391c, 391d) may be deformed toward the base 391a. Depending on the degree of restoration of the diffusion plate 31, the elastic portion (391b, 391c, 391d) may be restored to its original state by elastic force.

For example, the rear surface of the diffusion plate 31 may come in contact with the head 392 and the first part 391b. As another example, the rear surface of the diffusion plate 31 may come in contact with the head 392 and the second part 391c. As another example, the rear surface of the diffusion plate 31 may come in contact with the head 392, the first part 391b, and the second part 391c.

Accordingly, the supporter 39 can support the deflection of the diffusion plate 31 at a plurality of points. That is, the supporter 39 can maintain a gap between the reflective sheet 60 and the diffusion plate 31 at a certain level while minimizing damage to the diffusion plate 31.

Referring to FIGS. 1 to 21, a display device 1 may include: a display panel 10; a frame 80 positioned behind the display panel 10; a substrate 40 positioned between the display panel 10 and the frame 80 and coupled to the frame 80; a plurality of light sources 51 positioned on the substrate 40 and providing light to the display panel 10; an optical part 30 positioned between the display panel 10 and the plurality of light sources 51; and a supporter 39 positioned between the optical part 30 and the substrate 40 and supporting the optical part 30, wherein the supporter 39 may be elongated, may be positioned between the plurality of light sources 51, and ma be detachably coupled to the frame 80 in in a longitudinal direction of the supporter 39.

The supporter 39 may include: a base 391a extending in the longitudinal direction of the supporter 39; a protrusion 393c protruding rearward from the base 391a and passing through the substrate 40; and a locking portion 393d formed at a lateral side of the protrusion 393c, wherein the frame 80 may include: an insertion hole OPc1 which extends in a longitudinal direction of the base 391a, into which the protrusion 393c is inserted, and which has a greater length than the protrusion 393c; and an insertion groove OPc2 which is formed at one side of the insertion hole OPc1 and into which the locking portion 393d is inserted.

The locking portion 393d may include: a first portion protruding upward from an upper lateral side of the protrusion 393c; and a second portion protruding downward from a lower lateral side of the protrusion 393c, wherein the insertion groove OPc2 may have a shape corresponding to the first portion and the second portion.

The locking portion 393d may be engaged by a rear surface of a portion where a boundary of the insertion hole OPc1 of the frame 80 is defined.

The supporter 39 may further include: a first stopper 393a protruding rearward from the base 391a, passing through the substrate 40, and spaced apart from the protrusion 393c in the longitudinal direction of the base 391a; and a second stopper 393b opposite the first stopper 393a with respect to the protrusion 393c, wherein the frame 80 may further include: a first hole OPa which is spaced apart from the insertion hole OPc1 in the longitudinal direction of the base 391a and into which the first stopper 393a is inserted; and a second hole OPb which is opposite the first hole OPa with respect to the insertion hole OPc1, into which the first stopper 393a is inserted, and which has a greater length than the second stopper 393b.

The insertion groove OPc2 may be located closer to the second hole OPb than the first hole OPa, a distance between the insertion groove OPc2 and the first hole OPa may be greater than a distance between the locking portion 393d and the first stopper 393a.

A maximum width W20 of the supporter 39 may be less than a distance between the plurality of light sources 51 in a direction orthogonal to the longitudinal direction of the supporter 51, a central area of the supporter 39 may define the maximum width W20 of the supporter 39.

The supporter 39 may include: a base 391a extending in the longitudinal direction of the supporter 39; an elastic portion (391b, 391c, 391d) having elasticity and including a first end and a second end fixed to a front surface of the base 391a, wherein the elastic portion (391b, 391c, 391d) is positioned between the first end and the second end and is spaced forward from the front surface of the base 391a; and a head 392 extending toward the optical part 30 on the elastic portion (391b, 391c, 391d).

The elastic portion (391b, 391c, 391d) may include: a first part 391b forming the first end of the elastic portion (391b, 391c, 391d) and curved; a second part 391c forming the second end of the elastic portion (391b, 391c, 391d) and curved; and a third part 391d positioned between the first part 391b and the second part 391c, connected to the first part 391b and the second part 391c, and lower than a front end of the first part 391b and a front end of the second part 391c, wherein the head 392 may protrude forward from the third part 391d, and may protrude forward further than the front ends of the first part 391b and the second part 391c.

A front end of the head 392 may support a rear surface of the optical part 30.

At least one of the front end of the first part 391b and the front end of the second part 391c may support the rear surface of the optical part 30.

A length W10 of the base 391a may be greater than a distance W11 between the first end and the second end of the elastic portion (391b, 391c, 391d).

The display device 1 may further include a heat sink 83 positioned between the substrate 40 and the frame 80 and coupled to the substrate 40 and the frame 80, wherein the heat sink 83 may include a coupling portion 83s which is formed by being pressed forward from a rear surface of the heat sink 83 and to which the supporter 39 is detachably coupled.

The display device 1 may further include a reflective sheet 60 positioned on the substrate 40, wherein the supporter 39 may include: a base 391*a* positioned on the reflective sheet 60; and a foot (393*a*, 393*b*, 393*c*, 393*d*) protruding from the base 391*a* and coupled to the coupling portion 83*s*, wherein the reflective sheet 60 may include a slot 69*s* through which the foot (393*a*, 393*b*, 393*c*, 393*d*) passes and having a size less than a size of the base 391*a*.

The optical part 30 may include a diffusion plate 31, wherein the supporter 39 may include a plurality of supporters 39 disposed on the frame 80 at certain intervals.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the disclosure should be determined by reasonable interpretation of the appended claims, and all changes coming within the equivalency range of the disclosure are intended to be embraced in the scope of the disclosure.

What is claimed is:

1. A display device comprising:
a display panel;
a frame positioned behind the display panel;
a substrate positioned between the display panel and the frame and coupled to the frame;
a plurality of light sources positioned on the substrate and providing light to the display panel;
an optical part positioned between the display panel and the plurality of light sources; and
a supporter elongated, positioned between the optical part and the substrate, and supporting the optical part, the supporter moved in a longitudinal direction of the supporter and coupled to the frame,
wherein the supporter comprises:
a base extending in the longitudinal direction of the supporter;
a first stopper protruding rearward from the base and inserted into a first hole of the frame;
a second stopper protruding rearward from the base, inserted into a second hole of the frame, and spaced apart from the first stopper in a longitudinal direction of the base;
a protrusion protruding rearward from the base, passing through a third hole of the frame, and positioned between the first stopper and the second stopper in the longitudinal direction of the base; and
a locking portion extending in a direction intersecting the protrusion from the protrusion,
wherein the first hole of the frame has a length corresponding to a length of the first stopper in the longitudinal direction of the base,
wherein the second hole of the frame has a length greater than a length of the second stopper in the longitudinal direction of the base, and
wherein the third hole of the frame has a length greater than a length of the protrusion in the longitudinal direction of the base.

2. The display device of claim 1,
wherein the third hole of the frame comprises:
an insertion hole which extends in the longitudinal direction of the base, into which the protrusion is inserted, and which has a greater length than a length of the protrusion; and
an insertion groove which is connected to the insertion hole and into which the locking portion is inserted.

3. The display device of claim 1, wherein the locking portion
protrudes from a lateral side of the protrusion.

4. The display device of claim 1, wherein
in the longitudinal direction of the base, a distance between the third hole and the first hole of frame is greater than a distance between the locking portion and the first stopper.

5. The display device of claim 1, wherein the base is positioned between the plurality of light sources, and
wherein a central area of the base defines a maximum width of the base.

6. The display device of claim 1, wherein the supporter comprises:
an elastic portion having elasticity and including a first end and a second end fixed to a front surface of the base, wherein the elastic portion is positioned between the first end and the second end and is spaced forward from the front surface of the base; and
a head extending toward the optical part on the elastic portion.

7. The display device of claim 6, wherein the elastic portion comprises:
a first part forming the first end of the elastic portion and curved;
a second part forming the second end of the elastic portion and curved; and
a third part positioned between the first part and the second part, connected to the first part and the second part, and lower than a front end of the first part and a front end of the second part, and
wherein the head protrudes forward from the third part and protrudes forward further than the front ends of the first part and the second part.

8. The display device of claim 7, wherein a front end of the head supports a rear surface of the optical part.

9. The display device of claim 8, wherein at least one of the front end of the first part or the front end of the second part supports the rear surface of the optical part.

10. The display device of claim 7, wherein a length of the base is greater than a distance between the first end and the second end of the elastic portion.

11. A display device comprising
a display panel;
a frame positioned behind the display panel;
a substrate positioned between the display panel and the frame and coupled to the frame;
a plurality of light sources positioned on the substrate and providing light to the display panel;
an optical part positioned between the display panel and the plurality of light sources;
a supporter elongated, positioned between the optical part and the substrate, and supporting the optical part, the supporter moved in a longitudinal direction of the supporter and coupled to the frame; and a coupling portion stepped-up forward from a front surface of the frame, wherein the supporter is detachably coupled to the coupling portion.

12. The display device of claim 1, further comprising:

a coupling portion stepped-up forward from a front surface of the frame; and a reflective sheet positioned on the substrate, wherein the base is positioned on the reflective sheet, wherein the first hole and the second hole are formed in the coupling portion, and wherein the first stopper and the second stopper are inserted into the first hole and the second hole through a slot of the reflective sheet, respectively.

13. The display device of claim 1, wherein the optical part comprises a diffusion plate, and wherein the supporter comprises a plurality of supporters disposed on the frame at certain intervals.

14. The display device of claim 1, wherein the supporter is detachably coupled to the frame.

15. The display device of claim 1, wherein the locking portion is engaged by a rear surface of the frame.

16. The display device of claim 1, wherein the locking portion is adjacent to a central area of the base, wherein the first stopper is positioned between the locking portion and one end of the base in the longitudinal direction of the base, and wherein the second stopper is positioned between the locking portion and the other end of the base in the longitudinal direction of the base.

* * * * *